United States Patent Office 3,796,719
Patented Mar. 12, 1974

3,796,719
SUBSTITUTED SULFONYLUREAS
Hermann Bretschneider, Klaus Grassmayr, and Kraft Hohenlohe-Oehringen, Innsbruck, Austria, and André Grüssner, Basel, Switzerland, assignors to Hoffmann-La Roche Inc., Nutley, N.J.
No Drawing. Original application Oct. 17, 1967, Ser. No. 675,796, now abandoned. Divided and this application Sept. 30, 1971, Ser. No. 185,390
Claims priority, application Switzerland, Oct. 28, 1966, 15,651/66; Apr. 24, 1967, 5,822/67; July 17, 1967, 10,187/67
Int. Cl. C07d 29/34
U.S. Cl. 260—293.56          8 Claims

ABSTRACT OF THE DISCLOSURE

Novel bicyclic sulfonylurea derivatives and intermediates therefor have been prepared by various processes, such as, for example, by the reaction of a sulfonylcarbamic acid or a sulfonylisocyanate with a bicyclic amine. The bicyclic sulfonylurea derivatives are useful as hypoglycemic agents.

---

This is a division of application Ser. No. 675,796 filed Oct. 17, 1967, now abandoned.

BRIEF DESCRIPTION OF THE INVENTION

The invention relates to novel sulfonylurea derivatives useful as hypoglycemic agents and to novel intermediates useful in the preparation thereof. More particularly, the invention relates to hypoglycemic compounds of the formula

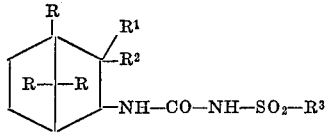

(I)

wherein R is hydrogen or methyl, $R^1$ is hydrogen; $R^2$ is hydroxy or $R^1$ and $R^2$, taken together, are the oxygen atom of a keto group (which can also be present as a ketal), $R^3$ is selected from the group consisting of phenyl; phenyl substituted by halogen, lower alkyl, lower alkoxy, lower alkylthio, amino, acetyl, acylamino or diacylimido; benzamidoethylphenyl substituted by one or more substituents selected from the group consisting of lower alkoxy and halogen; and a 5- or 6-membered, N-bonded, nitrogen-containing heterocyclic ring, and salts thereof with pharmaceutically acceptable bases.

A preferred subgenus comprises a compound of Formula I wherein $R^3$ is lower alkylphenyl, preferably p-methylphenyl.

In another aspect, the invention relates to intermediates of the formula

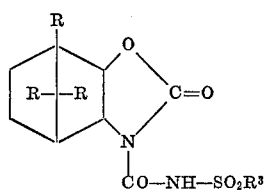

(VII)

wherein R and $R^3$ are as previously described.

The compounds of Formula VII are also useful as hypoglycemic agents.

In still another aspect, the invention relates to processes for the preparation of novel compounds.

DETAILED DESCRIPTION

In accordance with the invention, the compounds of the formula

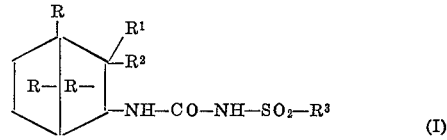

(I)

wherein R is hydrogen or methyl, $R^1$ is hydrogen; $R^2$ is hydroxy or $R^1$ and $R^2$, taken together, are the oxygen atom of a keto group (which can also be present as a ketal), $R^3$ is selected from the group consisting of phenyl; phenyl substituted by halogen, lower alkyl, lower alkoxy, lower alkylthio, amino, acetyl, acylamino or diacylimido; benzamidoethylphenyl substituted by one or more substituents selected from the group consisting of lower alkoxy and halogen; and a 5- or 6-membered, N-bonded, nitrogen-containing heterocyclic ring, and salts thereof with pharmaceutically acceptable bases, can be prepared by reacting a reactive derivative of a sulfonylcarbamic acid of the formula

$$R^3-SO_2-NH-COOH \qquad (II)$$

or a sulfonylisocyanate of the formula

$$R^3-SO_2-NCO \qquad (III)$$

wherein $R^3$ is as described above, with a bicyclic amine of the formula

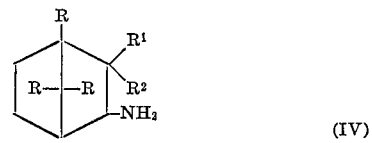

(IV)

wherein R, $R^1$ and $R^2$ are as described above. [Procedure (a)]

Another process for preparing the compounds of Formula I comprises reacting a salt of a compound of the formula $$R^3-SO_3H \qquad (V)$$

wherein $R^3$ is as described above, with a bicyclic isocyanate of the formula

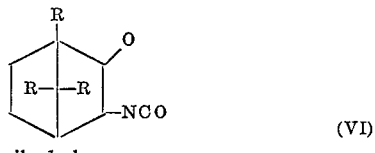

(VI)

wherein R is as described above, or the corresponding ketal. [Procedure (b)]

Still another process for preparing the compounds of Formula I comprises treating a compound of the formula

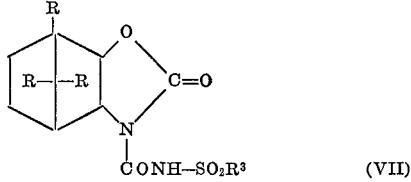

(VII)

wherein R and $R^3$ are described above, with an alkali metal compound, such as sodium hydroxide, potassium hydroxide or the like. [Procedure (c)]

If desired, the ring-located keto group in the reaction product obtained in accordance with procedures (a) or (b) is reduced and the isomers obtained thereby may be separated; the hydroxy group in the reaction product, if desired, can be oxidized, and the ketal can be saponified, if desired.

A compound characterized by the formula $$Z-CO-NH-SO_2-R^3 \qquad (IIa)$$

wherein $R^3$ is as described above and Z is lower alkoxy, aryloxy, lower alkylthio, arylthio, imidazolyl -(1) or 3,5-di-lower alkylpyrazoyl -(1), is preferably used as the reactive sulfonylcarbamic acid derivative in process variant (a).

As used herein, the term "lower alkyl" denotes a straight chain or branched chain alkyl group containing 1–7 carbon atoms, e.g., methyl, ethyl, propyl, isopropyl, butyl, pentyl, hexyl and the like. The term "lower alkoxy" denotes lower alkyl ether groups in which the lower alkyl moiety is as defined above. The term "halogen" denotes bromine, iodine and chlorine; chlorine is preferred. The term "acylamino" denotes an aliphatic or aromatic acyl residue such as acetamino, benzoylamino and the like. The term "diacylimido" denotes, for example, phthalimido. A preferred substituted benzamidoethylphenyl is alkoxy-halobenzamidoethylphenyl, most preferred is the $\beta$-(2-methoxy-5 - chlorobenzamido) - ethylphenyl residue. The term "aryl" as used herein denotes a group such as phenyl or tolyl. Examples of 5- or 6-membered, N-bonded, nitrogen-containing heterocyclic rings are piperidinyl and pyrrolidinyl. A preferred 3,5-di-(lower alkyl)-pyrazolyl-(1) residue is the 3,5-dimethyl-pyrazolyl-(1) residue.

Compounds of this invention corresponding to Formula I are exemplified by the following:

1-(p-toluenesulfonyl)-3-(2-endo-hydroxy-3-endobornyl)-urea;
1-(p-toluenesulfonyl)-3-(3-endo-D-camphoryl)-urea;
1-(p-chlorobenzenesulfonyl)-3-(3-endo-D-camphoryl)-urea;
1-(p-methylthiobenzenesulfonyl)-3-(3-endo-D-camphoryl)-urea;
1-(p-toluenesulfonyl)-3-(2-exo-hydroxy-3-endobornyl)-urea;
1-(p-toluenesulfonyl)-3-(3-endo-norcamphoryl)-urea;
1-(p-toluenesulfonyl)-3-(2-endo-hydroxy-3-endo-norbornyl)-urea;
1-(1-piperidylsulfonyl)-3-(3-endo-D-camphoryl)-urea;
1-{4-[β-(2-methoxy-5-chloro-benzamido)-ethyl]-benzenesulfonamido}-3-(3-endo-D-camphoryl)-urea;

and salts thereof with pharmaceutically acceptable bases.

Compounds of this invention corresponding to Formula VII are exemplified by the following:

endobornylene-[2,3-d]-N-(p-toluenesulfonylcarboxamino)-oxazolidinone;
endo-nor-bornylene-[2,3-d]-N-(p-toluenesulfonylcarboxamino)-oxazolidinone; and the like.

The compounds of Formula I form salts with pharmaceutically acceptable bases and such salts are also within the scope of this invention. Thus, the compounds of Formula I form salts with pharmaceutically acceptable bases which preferably include alkali metal bases such as sodium hydroxide, potassium hydroxide and the like.

Examples of ketals of Procedure (b) are dialkyl ketals, such as dimethyl or diethyl ketal, and alkylene ketals, such as ethylene ketal. The saponification of such ketals can be carried out with acidic agents, for example, mineral acids, such as hydrochloric acid, and preferably in the presence of an organic solvent, such as acetone.

In one embodiment of the process variant (a), there is used a compound of Formula IIa, wherein Z is imidazolyl-(1). Conveniently, the corresponding sulfonamide (preferably as an alkali metal salt) is reacted with carbonyldiimidazole in a suitable anhydrous organic solvent which is inert to carbonyl compounds and does not contain hydroxy groups, and the sulfonylcarbamic acid imidazolide which is formed is then allowed to react in situ with a compound of Formula II. Organic solvents, for example, dimethylformamide, hydrocarbons, such as benzene and halogenated hydrocarbons, such as chloroform, are suitable for this reaction.

A ring-located keto group which may be present in the reaction product obtained can be subsequently reduced to the hydroxyl group. This can be brought about in a known manner, for example, by treatment with a complex metal hydride, such as sodium borohydride, or by catalytic hydrogenation. The cis-trans isomers which are obtained in the reduction can then, if desired, be separated according to known methods, for example, by crystallization or by chromatography. On the other hand, a hydroxy group present in the reaction product can be oxidized to the keto group in a known manner, for example, by means of chromic acid.

According to another process of the invention, a compound of the Formula VI, wherein the meaning of R is as described above, is reacted with a salt of a sulfonic acid of Formula V. A salt of a strong base, for example, an alkali metal salt, such as the sodium salt, is conveniently employed. Organic solvents of the type mentioned above which are inert to the reactants, can be suitably utilized.

The compounds of Formula I, obtained in accordance with the invention, can exist in various configurations, for example, as a racemate or in the optically active form, depending upon the stereochemistry of the starting materials of Formula IV or VI. Preferred starting compounds of Formulas IV and VI are those wherein R represents a methyl group. Especially preferred are those which are derived configuratively from DL- or D-camphor, or from borneol or isoborneol.

The starting materials for the processes of the invention can, insofar as they are not known, be manufactured according to known methods. Thus, the starting compounds of Formula IV can, for example, be obtained by converting the corresponding ketone into the isonitroso ketone, for instance, by treatment with amyl nitrite and reducing the reaction product to the amino ketone, for example, by means of zinc in caustic soda. The amino ketone thus obtained can, if desired, be ketalized or reduced to the amino alcohol. The ketalization can be undertaken in a known manner, for example, by treatment with the corresponding alcohol in the presence of anhydrous acid, such as p-toluenesulfonic acid. The reduction of an amino ketone to the amino alcohol can, for example, be effected with sodium borohydride or by catalytic hydrogenation. The isocyanates of the Formula VI can be obtained from the corresponding amino ketones or ketals by reaction with phosgene.

The invention further relates to a process for preparing compounds of Formula VII, which comprises reacting a compound characterized by the formula

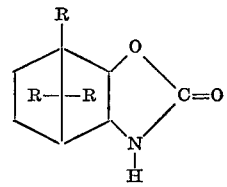

VIII with a derivative of sulfonylcarbamic acid of Formula II or with a derivative of sulfonylisocyanate of Formula III. This reaction can be carried out in the manner described above under process variant (a) for the reaction of a sulfonylcarbamic acid derivative or a sulfonylisocyanate derivative with a compound of Formula IV.

The compound of Formula VIII can be prepared from the corresponding aminoalcohol, for example, from aminoborneol or amino-norborneol, and phosgene in the presence of an acid-binding agent.

Except for the starting materials whose preparation has been herein described, all other starting materials necessary for the processes of the invention are compounds which are either commercially available and/or are known in the prior art.

The compounds of Formulas VII and VIII are useful as intermediates for the preparation of the useful compounds of Formula I.

The compounds of Formulas I and VII are distinguished by blood sugar depressant activity on oral administration. Thus, the compounds of Formulas I and VII are useful as hypoglycemic agents or as anti-diabetic agents. Their useful hypoglycemic properties are manifested upon administration to warm-blooded animals. For example, when 1-(2-endo-hydroxy-3-endo-bornyl)-3-(p-tolylsulfonyl)-urea which has an $LD_{50}$ of 5000 mg./kg. p.o. in rats is administered to dogs in doses in the range of 0.35 to 3.4 mg./kg. it causes a marked lowering of blood sugar levels over a 24-hour period as compared to controls. Furthermore, the compounds of Formulas I and VII have effects qualitatively similar in many respects to those of 1-butyl-3-sulfanilylurea, well known for its therapeutic uses and properties. Thus, the compounds of this invention demonstrate a pattern of activity associated with hypoglyceric agents of known efficacy and safety.

The compounds of Formulas I and VII can be used as medicaments in the form of tablets, capsules or dragees. Suitable dosage units contain from about 10 to 250 mg. Suitable dosage regimens in warm-blooded mammals are from about 0.15 mg./kg. per day to about 7.0 mg./kg. per day, but for any particular subject, the specific dosage regimen should be adjusted according to individual need and professional judgment of the person administering or supervising the administration of the compound of Formula I.

The orally administerable pharmaceutical preparations can contain in admixture with the compounds of Formulas I and VII, organic or inorganic carrier materials, such as, for example, lactose, starch, talc, magnesium stearate, and the like. They can also contain other active ingredients, including other hypoglycemic agents.

The following non-limiting examples further illustrate the invention. All parts are by weight and all temperatures are in degrees centigrade, unless otherwise mentioned.

EXAMPLE 1

Preparation of 1-(p-toluenesulfonyl)-3-(2-endo-hydroxy-3-endo-D-bornyl)-urea 13.6 g. of 3-endoamino-D-borneol and 19.6 g. of tosyl ethyl urethane are ground and mixed together. The mixture is heated with 4 ml. of pyridine for 5 hours on a boiling water-bath with occasional agitation. After cooling, the resulting yellow resin is dissolved in 250 ml. of 1 N sodium hydroxide at room temperature. This solution is shaken out three times with 50 ml. of ether and the aqueous-alkaline phase is acidified with half-conc. HCl, whereby an oil settles out. The mixture is allowed to stand at 0° for about an hour until the mother liquor is only slightly turbid. The supernatant liquid is decanted and the solidified residue is washed with about 10 ml. of water. After recrystallization from alcohol/water, 11.5 g. of 1-(p-toluenesulfonyl)-3-(2-endo-hydroxy-3-endo-D-bornyl)-urea is obtained having a decomposition point of 192–195°; $[\alpha]_D = +63.8°$ (in ethanol).

EXAMPLE 2

Preparation of 1-(p-toluenesulfonyl)-3-(3-endo-D-camphoryl)-urea 26 ml. of p-tosyl isocyanate are added dropwise with stirring to a solution of 20.3 g. of 3-endoamino-D-camphor hydrochloride in 150 ml. of absolute dimethylformamide. The reaction mixture warms to about 40°. After cooling to 20°, 28 ml. of absolute triethylamine are added dropwise over a half hour period, whereby the reaction mixture once again warms to about 40°. It is cooled and stirred at 20° for an additional 15 hours. The dimethylformamide and the excess of triethylamine are removed under vacuum. The remaining semi-solid residue is treated with 500 ml. of 0.5 N sodium hydroxide and shaken until dissolved. This solution is shaken out with two 100 ml. portions of ether, filtered and acidified with dilute hydrochloric acid. The precipitate that forms is removed by filtration, washed with ice-water, pressed out and recrystallized from methanol/water (about 300 ml. of methanol and 50 ml. of water). After vacuum drying at 100° to a constant weight, there is obtained 24.4 g. of 1-(p-toluenesulfonyl)-3-(3-endo-D-camphoryl)-urea (67% of the theory), having a decomposition point of 190°. $[\alpha]_D^{19} = -17.7°$.

EXAMPLE 3

Preparation of 1-(p-toluenesulfonyl)-3-(2-endo-hydroxy-3-endo-bornyl)-urea 10 g. of 1-(p-toluenesulfonyl)-3-(3-endo-D-camphoryl)-urea are dissolved in 120 ml. of dilute caustic soda (1.4 g. of sodium hydroxide in 120 ml. of water), treated with 3 g. of sodium borohydride (about 71%) and stirred at 20° for 15 hours. The strongly alkaline solution is carefully acidified with dilute acetic acid, whereby, following an initial evolution of hydrogen, the desired product precipitates. The product is isolated, washed with ice-water and recrystallized from alcohol/water. After drying to constant weight, there is obtained 6.5 g. of 1-(p-toluenesulfonyl)-3-(2-endo-hydroxy-3-endo-bornyl)-urea.

After two recrystallizations from acetone/petroleum ether, the product has a specific rotation of $[\alpha]_D^{19} = +63.8°$ (in ethanol; c.=5) and a decomposition point of 193°.

EXAMPLE 4

Preparation of 1-(p-toluenesulfonyl)-3-(3-endo-D-camphoryl)-urea 1.06 g. of sodium p-toluenesulfonamide are suspended in 30 ml. of absolute dimethylformamide and treated at 20° with 0.97 g. of D-camphoryl-(3) isocyanate with stirring until dissolved. The resulting solution is stirred at 20° for an additional 15 hours. The solvent is evaporated and the oily residue is dissolved in 20 ml. of 0.5 N caustic soda. The resulting alkaline solution is acidified with dilute hydrochloric acid, whereby the product precipitates. The precipitate is isolated, washed with water and recrystallized from methanol/water to yield 1.6 g. (88% of the theory) of 1-(p-toluenesulfonyl)-3-(3-endo-D-camphoryl)-urea, having a decomposition point of 190°. The IR spectrum of this product is identical with that of the product obtained in accordance with Example 2.

EXAMPLE 5

Preparation of 1-(p-toluenesulfonyl)-3-(3-endo-D-camphoryl)-urea 1 g. mixture of 3-endo-tosylureido-D-borneol-isoborneol isomers (according to specific rotation, 58% cis and 42% trans) is dissolved in 10 ml. of absolute acetone and treated dropwise with stirring at room temperature with an amount of chromic acid standard solution (26.7 g. of chromium trioxide dissolved in 23 ml. of conc. $H_2SO_4$ and sufficient water to make 100 ml. of solution) sufficient to color the supernatant solution orange-brown. Thereafter, the reaction mixture is diluted with 80 ml. of water to dissolve the green chromium salts present. The crystalline oxidation product is removed by filtration, washed well with water and recrystallized from methanol/water to yield 0.83 g. (83% of the theory) of 1-p-toluenesulfonyl)-3-(3-endo-D-camphoryl)-urea. The IR spectrum of the product is identical with that of the product obtained in accordance with Example 2.

EXAMPLE 6

Preparation of 1-(p-chlorobenzenesulfonyl)-3-(3-endo-D-camphoryl)-urea 20.3 g. of 3-endoamino-D-camphor hydrochloride are dissolved in 150 ml. of dimethylformamide and treated with 26 ml. of p-chlorobenzenesulfonyl isocyanate. As the reaction proceeds, the temperature rises to 42°. Thereafter, the mixture is allowed to cool to 20° and 28 ml. of triethylamine are added dropwise with stirring. Again, the temperature rises to 40°. The mixture is cooled and stirred at room temperature for 15 hours. Thereafter, the solvent is removed by evaporation under vacuum. The residue is dissolved in 0.5 N caustic soda. The resulting solution is shaken out twice with ether and acidified with hydrochloric acid. The crystals which form are removed by filtration, washed with water and dried under vacuum at 50° to yield 1-(p-chlorobenzenesulfonyl)-3-(3 - endo-D-camphoryl)-urea, having a melting point of 187–189° (from acetonitrile); and $[\alpha]_D^{25} = -29.4°$ (c.=3 in chloroform).

EXAMPLE 7

Preparation of 1-(p-methylthiobenzenesulfonyl)-3-(3-endo-D-camphoryl)-urea 45 g. of p-methylthio-benzenesulfonamide-sodium are stirred in 200 ml. of dimethylformamide at −10° with 39.2 g. of carbonyldiimidazole and 49.7 g. of 3-endoamino-D-camphor hydrochloride. After complete reaction, the solvent is removed by distillation under vacuum. The residue is dissolved in 1 N caustic soda. The resulting solution is ether-extracted and made congo-acid with hydrochloric acid to yield 1-(p-methylthiobenzenesulfonyl)-3-(3 - endo-D-camphoryl)-urea, which after recrystallization from butyl acetate has a melting point of 183–185°; and $[\alpha]_D^{20} = -42.6°$ (c.=3 in chloroform).

EXAMPLE 8

Preparation of 1-(p-toluenesulfonyl)-3-(2-exo-hydroxy-3-endo-D-bornyl)-urea 1 g. of endoamino-D-isoborneol, 1.3 g. of tosyl ethyl urethane and 12 drops of absolute pyridine are heated on a boiling water-bath with occasional agitation for 7 hours. The reaction mixture is thereafter dissolved in 30 ml. of 0.5 N sodium hydroxide. The resulting solution is extracted with two 20 ml. portions of ether and the aqueous phase is acidified with half-conc. hydrochloric acid. The product which separates out is taken up in ether. The residue obtained following evaporation of the ethereal solution yields, when recrystallized from acetone/petroleum ether, 0.75 g. of 1-(p-toluenesulfonyl)-3-(2-exo-hydroxy-3-endo-D-bornyl)-urea, having a melting point of 158°; and $[\alpha]_D^{20} = +34.4°$ (c.=3 in methanol).

EXAMPLE 9

Preparation of 1-(p-toluenesulfonyl)-3-(3-endo-D,L-norcamphoryl)-urea

To a solution of 1.1 g. of 3-endoamino-D,L-norcamphor hydrochloride dissolved in 5 ml. of dimethylformamide are added 1.4 g. of p-tosylisocyanate dissolved in 3 ml. of dimethylformamide. The solution is allowed to stand at 20° for 3 hours. Thereafter, the solution is cooled with ice, added to 20 ml. of 1 N sodium hydroxide solution and extracted with ether. The aqueous phase is acidified with dilute acetic acid, whereupon 1-(p-toluenesulfonyl)-3-(3-endo-D,L-norcamphoryl)-urea crystallizes, having a melting point of 202°, from ethanol-water solution.

EXAMPLE 10

Preparation of 1-(p-toluenesulfonyl)-3-(2-endo-hydroxy-3-endo-D,L-norbornyl)-urea In an analogous procedure to Example 1, one can react 3-endoamino-D,L-nor-borneol with p-tosylethylurethane to form 1-(p-toluenesulfonyl)-3-(2-endo-hydroxy-3-endo-D,L-norbornyl)-urea, having a melting point of 196–198° (from acetone).

The 3-endoamino-D,L-norcamphor utilized in Example 9 and the 3-endoamino-D,L-norborneol utilized in Example 10 can be prepared according to the following procedure:

To a solution of 17.5 g. of D,L-norcamphor and 32.5 g. of amylnitrite in 150 ml. or benzene and 50 ml. of absolute ether, there is introduced at −10° sodium tertiary butylate, prepared from 24 g. of 50% sodium hydride and 150 ml. of tertiary butanol. The temperature of the reaction mixture is not allowed to rise about −8°. Thereafter, the reaction mixture is stirred for 1 hour at −10° and allowed to stand overnight at −5°. The reaction mixture is then added to 500 ml. of ice water, and the aqueous phase is washed with 2 portions of 300 ml. of ether and acidified with cold dilute hydrochloric acid. The oily isonitrosonor-D,L-camphor is extracted with ether, and the ether solution is dried over sodium sulfate and evaporated.

A solution containing 27.5 g. of the isonitroso-D,L-norcamphor produced above in 100 ml. of absolute ether is added drop by drop to a suspension of 15 g. of lithium aluminum hydride in 400 ml. of ether. The mixture is allowed to boil for 4 hours, following which the mixture is decomposed by the addition of water. The resulting solution is mixed with dilute potassium hydroxide solution. The ether phase is decanted and precipitated with ethereal hydrochloric acid. The precipitate is filtered and recrystallized from alcohol-acetone to yield 3-endoamino-D,L-norborneol hydrochloride, having a melting point of 255–260° (with decomposition).

5.05 g. of isonitroso-D,L-norcamphor are dissolved in a solution of 10 g. of sodium hydroxide in 60 ml. of water. To this solution are added 15 g. of zinc dust over a 5-minute period. Fifteen minutes thereafter, 150 ml. of ether are added, and the mixture is stirred for 10 minutes. The ethereal solution is decanted and precipitated with ethereal hydrochloric acid. The precipitate is recrystallized from an alcohol/acetone and alcohol/ether solution, to yield 3-endoamino-D,L-norcamphor hydrochloride, having a melting point of 171–174°.

EXAMPLE 11

Preparation of 1-(1-piperidylsulfonyl)-3-(3-endo-D-camphoryl)-urea 8 grams of D-camphoryl-3-isocyanate are dissolved in 80 ml. of absolute benzene. The solution is mixed with 7.5 grams of 1-sulfamylpiperidine and 6 ml. of triethylamine and heated at reflux temperature for 3 hours. The reaction mixture is allowed to stand at 20° for a period of 20 hours, whereupon the benzene is removed by evaporation. The residue is dissolved in 150 ml. of 0.5 N sodium hydroxide solution. The alkaline solution is extracted with ether and then acidified with hydrochloric acid to a strong acid reaction. The precipitate which forms is recrystallized from ethanol/water to yield 7 g. of 1-(1-piperidylsulfonyl)-3-(3-endo-D-camphoryl)-urea, having a decomposition point of 190° and a $[\alpha]_D^{19} = -5.2\%$ (chloroform, c=1.5).

EXAMPLE 12

Preparation of 1{(4-(β-(2-methoxy-5-chloro-benzamido)-ethyl]-benzenesulfonamido}-3 - (3 - endo-D-camphoryl)-urea 4.8 grams of sodium hydride (50%) are suspended in 100 ml. of dimethylformamide and reacted with 38.6 g. of 4-[β-(2-methoxy-5-chloro-benzamido)-ethyl]benzenesulfonamide with stirring. After stirring for 1 hour at room temperature, the solution is cooled to −10°, mixed with 20.3 g. of carbonyl diimidazole portionwise and stirred over a 3-hour period at −10°. 20.3 g. of 3-endo-amino-D-camphor-hydrochloride are then added. The temperature of the mixture is allowed to rise slowly to room temperature and thereafter, is stirred overnight. The solvent is removed by distillation under vacuum at 65° C. The residue is dissolved in 2,000 ml. of 0.1 N sodium hydroxide solution. The resulting solution is extracted with 500 ml. of ether and the alkaline solution is acidified with 3 N hydrochloric acid to a congo acid reaction. The separated oil is extracted with ethyl acetate. The ethyl acetate solution is washed with water, dried over sodium sulfate, and after filtration, dried in vacuum. The residue is crystallized from butyl acetate to yield 34 g. of {4-[β-(2-methoxy-5-chlorobenzamido)-ethyl]-benzenesulfonamido}-3 - (3 - endo-D-camphoryl)-urea.

EXAMPLE 13

Preparation of 1-(p-toluenesulfonyl)-3-(2-endo-hydroxy-3-endo-D-bornyl)-urea 1 g. of N-(p-toluenesulfonyl-carbamoyl)-endo-D-bornano[3',2':4,5]-oxazolidin-2-one is suspended in 10 ml. of 1 N sodium hydroxide solution and heated at reflux for 3 hours. The cooled solution is diluted with 20 ml. of water, whereby the separated oil is dissolved. The solution is then strongly acidified with 2 N hydrochloric acid. The precipitate which forms is removed by filtration, washed with water and recrystallized from alcohol/water to yield 1-(p-toluenesulfonyl)-3-(2-endo-hydroxy-3-endo-D-bornyl)-urea, which is identical to the product obtained in Example 1.

EXAMPLE 14

Preparation of 1-(p-toluenesulfonyl)-3-(2-endo-hydroxy-3-endo-D,L-bornyl)-urea 3.5 g. of N-(p-toluenesulfonyl-carbamoyl)-endo-D,L-norborano[3',2':4,5]-oxazolidin-2-one are heated in 70 ml. of 1 N sodium hydroxide solution for 3 hours over a water bath. Upon cooling, the solution is acidified with dilute acetic acid and the precipitate crystallizes from ethyl acetate to yield 1-(p-toluenesulfonyl)-3-(2-endo-hydroxy-3-endo-D,L-norbornyl)-urea, which is identical to the product of Example 10.

EXAMPLE 15

Preparation of 1-(p-toluenesulfonyl)-3-(3-endo-norcamphoryl)-urea

1 - (p - toluenesulfonyl)-3-(2-endo-hydroxy-3-endo-norbornyl)-urea is oxidized with chromic acid in an analogous manner to Example 5. The 1-(p-toluenesulfonyl)-3-(3-endo-norcamphoryl)-urea which forms is identical to the product of Example 9.

EXAMPLE 16

Preparation of N-(p-toluenesulfonyl-carbamoyl)-endo-D-bornano-[3',2':4,5]-oxazolidin-2-one A suspension of 20 g. of endo-D-bornano-[3',2':4,5]-oxazolidin-2-one in 100 ml. of absolute xylene is heated at reflux with 24 ml. of p-toluenesulfonylisocyanate for a period of 3 hours. The xylol is thereafter evaporated, and the residue is extracted several times with a total of 200 ml. of ether and thereafter recrystallized to yield N - (p - toluenesulfonyl-carbamoyl)-endo-D-bornano-[3',2':4,5]-oxazolidin-2-one having a decomposition point of 155°, $[α]_D$ 155° (chloroform, c.=3) from acetone/petroleum ether.

The starting material can be prepared according to the following procedure:

To a suspension of 70 g. of 3-endoamino-D-borneol and 140 g. of lead carbonate in 200 ml. of toluene are slowly dripped with stirring 280 ml. of a 20% solution of phosgene in toluene. Upon completion of the reaction, the mixture is stirred for an additional hour, filtered and the filtrate is washed with hot toluene. The filtrate is evaporated and the residue recrystallized from acetone-petroleum ether to yield endo-D-bornano-[3',2':4,5]-oxazolidin-2-one which decomposes at 168°, $[α]_D$ +87° (alcohol, c.=3).

EXAMPLE 17

Preparation of N-(p-toluenesulfonyl-carbamoyl)-endo-D,L-norbornano-[3',2':4,5]-oxazolidin-2-one 3 g. of endo-D,L-norbornano-[3',2':4,5]-oxazolidin-2-one are boiled with 4.3 g. of p-toluenesulfonylisocyanate in 30 ml. of toluene over a 3-hour period. The reaction mixture is evaporated and the residue crystallized from ether/petroleum ether, to yield N-(p-toluenesulfonylcarbamoyl-endo - D,L - norbornano-[3',2':4,5]-oxazolidin-2-one having a melting point of 140–142° (from acetone/petroleum ether).

The starting material can be prepared according to the following procedure:

A solution of 6 g. of 3-amino-D,L-nor-borneol-hydrochloride in 20 ml. of water is made alkaline with sodium hydroxide solution. The released base is taken up in benzene and after evaporation of the benzene, is dissolved in 40 ml. of toluene. The resulting solution is reacted with 19 g. of lead carbonate and then, over a 45-minute period, is reacted with 30 ml. of a 20% solution of phosgene and toluene. The reaction mixture is stirred for 2 hours at 20° and filtered. The precipitate is boiled twice with 70 ml. of ethyl acetate. The combined filtrates are evaporated and crystallized to yield endo-D,L-nor-bornano-[3',2':4,5]-oxazolin-2-one having a melting point of 137–139° (from acetone/petroleum ether).

EXAMPLE 18

Preparation of 1-(p-toluenesulfonyl)-3-(3-endo-D,L-camphoryl)-urea 13.5 g. of 3-endo-amino-D,L-camphor hydrochloride are reacted with 15 ml. of p-tosylisocyanate according to the procedure of Example 2 to yield 15.3 g. of 1-(p-toluenesulfonyl)-3-(3-endo-D,L-camphoryl)-urea having a decomposition point of 164°.

The 3-endo-amino-D,L-camphor hydrochloride can be prepared according to the following procedure:

15 g. of isonitroso-D,L-camphor are dissolved in 120 ml. of sodium hydroxide solution (15 g. sodium hydroxide). The solution is charged with 18 g. of zinc dust. The resulting oily 3-endo-amino-D,L-camphor is dissolved in ether, and the ethereal solution is dried with potassium carbonate. Thereafter, the solution is treated to a strong acetic reaction with ether saturated with hydrochloric acid. The resulting precipitate is separated and washed with divided portions of ether, to yield 13.5 g. of 3-endo-amino-D,L-camphor hydrochloride having a decomposition point of 227°.

EXAMPLE 19

Preparation of 1-(p-toluenesulfonyl)-3-(2-endo-hydroxy-3-endo-D,L-bornyl)-urea

In an analogous manner to Example 3, through the reduction of 1-(p-toluenesulfonyl) - 3 - endo-D,L-camphoryl-urea, there is obtained 1-(p-toluenesulfonyl)-3-(2-endo-hydroxy-endo-D,L-bornyl)-urea having a decomposition point of 189° (after recrystallization from acetone-petroleum ether).

EXAMPLE 20

Preparation of 1-(p-toluenesulfonyl)-3-(3-endo-L-camphoryl)-urea

In an analogous manner to Example 2, 15 g. of 3-endo-amino-L-camphor D-camphor-10-sulfonate are reacted with 15 ml. of p-tosylisocyanate to yield 10.4 g. of 1-(p-toluenesulfonyl)-3-(3-endo-L-camphoryl)-urea, having a decomposition point of 190°; $[α]_D^{19}$= +17.5° (in chloroform, c.=3).

The endo-amino-L-camphor D-camphor - 10-sulfonate can be prepared according to the following procedure:

In a manner analogous to that of the J. Org. Chem. 28, 304 (1963), 3-isonitroso-L-camphor is prepared from L-camphor. According to the procedure of Example 18, paragraph 2, 3-endo-amino-L-camphor is obtained therefrom as a crude product in ethereal solution. The ethereal solution is reacted with methanolic solution of D-camphor-10-sulfonic acid whereby the salt precipitates. The resulting 3 - endo-amino-L-camphor D-camphor-10-sulfonate has a decomposition point of 199°; $[\alpha]_D^{19}=14.8°$ (in methanol, c=6).

EXAMPLE 21

Preparation of 1-(p-toluenesulfonyl)-3-(3-endo-hydroxy-3-endo-L-bornyl)-urea

In an analogous manner to Example 3, through the reduction of 1 - (p - toluenesulfonyl)-3-(3-endo-L-camphoryl)-urea, there is obtained 1-(p-toluenesulfonyl)-3-(3-endo-hydroxy-3-endo-L-bornyl)-urea having a decomposition point of 193°; $[\alpha]_D^{18}=-62.5°$ (ethanol, c.=4).

EXAMPLE 22

Tablets of the following composition are prepared, utilizing conventional procedure:

| | Mg. |
|---|---|
| 1 - (p-toluenesulfonyl) - 3-(2-endo-hydroxy-3-endo-D-bornyl)-urea | 50 |
| Avicel | 90 |
| Corn starch | 9.9 |
| Magnesium stearate | 0.1 |
| Total | 150 |

What is claimed is:
1. A compound of the formula

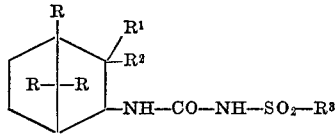

wherein R is hydrogen or methyl, $R^1$ is hydrogen, $R^2$ is hydroxy or $R^1$ and $R^2$, taken together, are the oxygen atom of a keto group, $R^3$ is selected from the group consisting of beta-(2-lower alkoxy-5-halobenzamido)-ethylphenyl, piperidinyl and pyrrolidinyl or salts thereof with pharmaceutically acceptable bases.

2. A compound in accordance with claim 1, wherein R is methyl.
3. A compound in accordance with claim 2, wherein $R^1$ is hydrogen and $R^2$ is hydroxy.
4. A compound in accordance with claim 2, wherein $R^1$ and $R^2$, taken together, are oxygen.
5. A compound in accordance with claim 4, where $R^3$ is beta-(2-lower alkoxy-5-halobenzamido)-ethylphenyl.
6. A compound in accordance with claim 5, 1-{4-[β-(2 - methoxy - 5 - chloro-benzamido)-ethyl]-benzenesulfonyl}-3-(3-endo-D-camphoryl)-urea.
7. A compound in accordance with claim 4, wherein $R^3$ is piperidinyl or pyrrolidinyl.
8. A compound in accordance with claim 7, 1-(1-piperidylsulfonyl)-3-(3-endo-D-camphoryl)-urea.

References Cited

UNITED STATES PATENTS

| 2,968,158 | 1/1961 | Ruschig et al. | 167—55 |
| 3,334,302 | 8/1967 | Beregi et al. | 260—397.7 |
| 3,352,884 | 11/1967 | Fonken et al. | 260—340.9 |

FOREIGN PATENTS

| 896,455 | 5/1962 | Great Britain | 260—553 |
| 1,185,180 | 9/1965 | Germany | 260—553 |

JOHN D. RANDOLPH, Primary Examiner

G. T. TODD, Assistant Examiner

260—307 C, 326.3, 553 D, 553 DA; 424—267, 274, 321